E. ROSENKRANZ.
SWITCH AND RECEPTACLE BOX.
APPLICATION FILED FEB. 18, 1911.
1,056,584.
Patented Mar. 18, 1913.
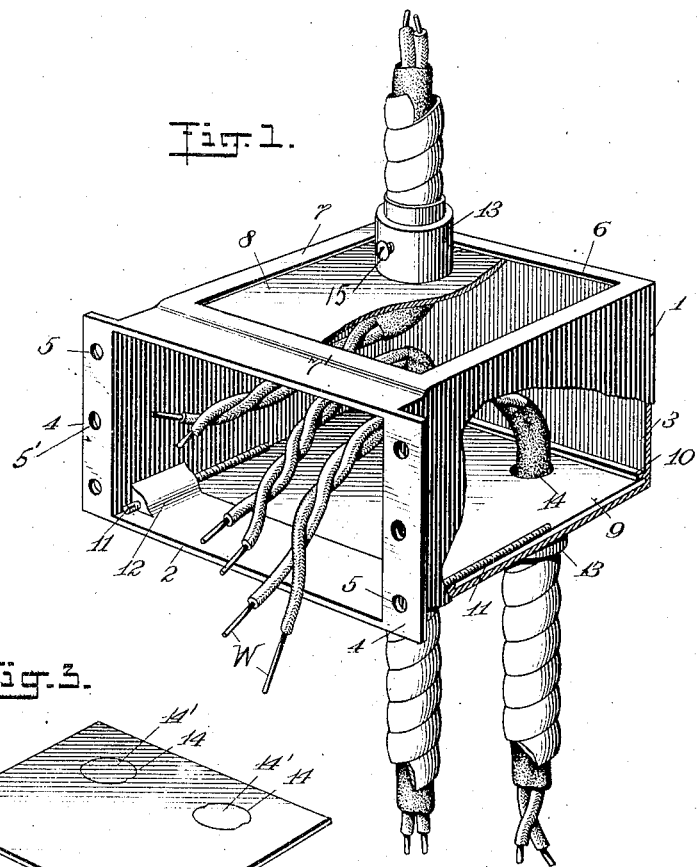
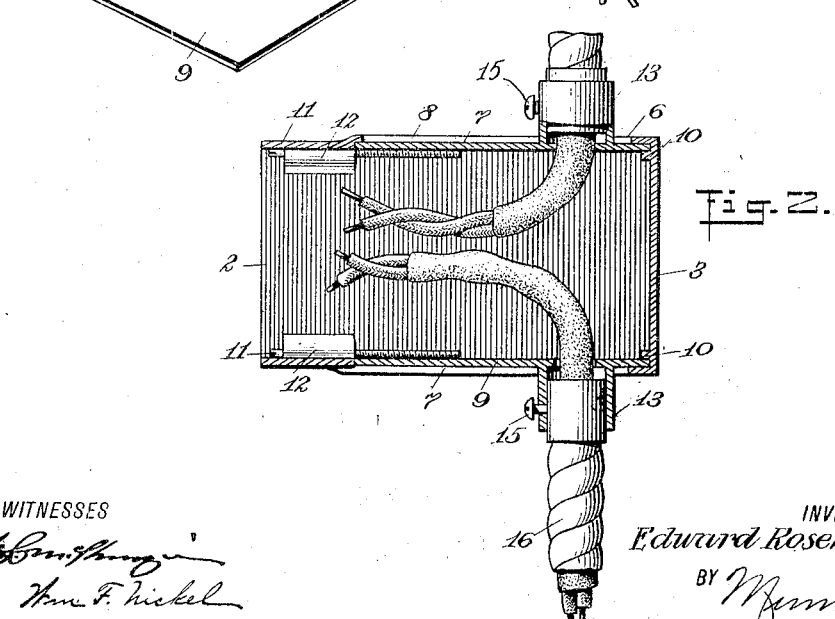
WITNESSES
INVENTOR
Edward Rosenkranz
BY
ATTORNEYS

UNITED STATES PATENT OFFICE.

EDWARD ROSENKRANZ, OF NEW YORK, N. Y.

SWITCH AND RECEPTACLE BOX.

1,056,584.  Specification of Letters Patent.  Patented Mar. 18, 1913.

Application filed February 18, 1911. Serial No. 609,311.

*To all whom it may concern:*

Be it known that I, EDWARD ROSENKRANZ, a citizen of the United States, and a resident of the city of New York, borough of Manhattan, in the county and State of New York, have invented a new and Improved Switch and Receptacle Box, of which the following is a full, clear, and exact description.

My invention relates to a switch and receptacle box designed to be supported in a recess in the wall or ceiling of a building, and having openings in the side closed by plates which receive and secure the ends of the cables or other conductors with which the building is wired. Heretofore it has been customary to make such boxes with permanent sides, but on account of the small sizes of these boxes it is often very difficult to pass the ends of the cables or conductors through the openings to the interior of the box and fasten them in place.

In my improved box there is an opening in one or more of the sides, and removable plates that close the same, and the holes through which the cables or conductors are passed are formed in these removable plates. Each plate is provided with fastening devices of suitable type, adjacent the openings, to hold the cable in position, and the side plates lie flush with the inside of the box when they are put in position, and form a continuation of the interior surface.

Reference is to be had to the accompanying drawings forming a part of this specification, in which the same characters of reference indicate the same parts in all the views.

Figure 1 is a perspective view, showing my improved switch and receptacle box with the side and part of the top broken away; Fig. 2 is a vertical longitudinal sectional view of my invention; and Fig. 3 is a perspective view of one of the removable plates for the same.

On the drawings, the box is indicated as a whole by the numeral 1. This box may be formed as a single casting or it may consist of plates which are suitably attached together to form the structure required. The front of the box is open, as shown at 2, and the rear end of the box, as shown at 3, is closed. The front of the box has a pair of flanges 4, which are pierced to provide apertures 5, through which the fastening screws are passed, to hold the box in place. Apertures 5', to hold the base of the switch, are also provided.

The top of the box has an opening 6 therein, and this opening 6 is surrounded on four sides by an inward-extending rim 7, the plane of the top surface of which is spaced a slight distance from the plane of the front portion of the top of the box, shown at 7'. A similar opening surrounded by a similar rim on four of its sides is formed in the bottom of the box.

The openings in the top and bottom of the box 1 are closed by a pair of removable plates 8 and 9. These plates 8 and 9 are inserted through the open front and normally rest upon the inturned rims 7, so that their inner surfaces lie flush with the inside of the box 1. A pair of transverse tenons or offsets 10 is formed on the back of the box 3 adjacent the rims 7, between which and the rims 7 the inner edges of the removable plates 8 and 9 are snugly received. 11 are screws or bolts passing through corner blocks 12, and engaging the opposite lateral edges of the plates 8 and 9, to hold the same in position. Each of the removable plates 8 and 9 has bosses or connectors 13 formed thereon. These bosses may be either on the inside or outside surface, but I prefer to form them on the outside surface of these plates so as not to take up space on the interior of the box 1. Openings 14 are formed in each of the plates, these openings being concentric with the flanges 13, but preferably of smaller diameter than the same. If desired, I may form these openings by stamping, and fill the same with plugs 14' until the box is made ready for use, at which time these plugs can be knocked out by a bolt or hammer in a manner well known to those skilled in the art. Each of the flanges 13 has a screw 15 to engage the end of a cable 16. On account of the relatively small diameter of the apertures 14 in the plates, the cables do not pass through the plates, but can extend no farther than the outside surface of the plates 8 and 9. The wires inside the cable, however, can be passed through these openings and bent inside the box or casing 1 in any manner that is required.

To use my improved box the plates 8 and 9 are taken out and the box is then inserted and fastened in the opening in the wall or base at a point convenient to the cables or conductors which it is to receive. The ends of these conductors pass freely through the openings in the top and bottom, and the plates 8 and 9 with the plugs 14' removed are then slipped in. The wires W pass freely through the apertures 14, so that these plates can be put into position without any difficulty. On inserting the plates 8 and 9, the ends of the wires W are slipped through the openings 14 before the plates enter the box 1; and as the plates are moved inside of the box they slide along the wires W until the rear edges of the plates are about ready to pass under the tenons 10. The plates will of course be held in tilted position, their rear edges being about on a level with the tenons 10, and their forward edges held away from the level of the top or bottom of the box 1, as the case may be. In this position, the ends of the coverings of the cables 16 can be inserted into the flanges 13, and the screws 15 can be tightened by inserting a screw-driver through the open end of the box, and between the plates and the forward edge of the side which it is intended to fit. As soon as the ends of the cables 16 are firmly fastened to the flanges 13, the rear edges of the plates are forced under the tenons 10, the plates 8 and 9 laid flush with the inside of the top and bottom of the box, respectively, and the fastening screws 11 inserted. This holds the plates 8 and 9 securely in position. The inner edges of the plates fit in between the rim 7 and the transverse tenons or offsets 10, and the outer edges lie flush with the inside of the front portion of the top and bottom of the box, so as to form therewith a smooth surface. The bolts or screws 11 are now inserted to hold the plates 8 and 9 in place, and the screws 15 keep the cables 16 from becoming detached and pulling the wires W out of place. The plates 8 and 9 may be of cast or sheet metal, and the bosses or flanges 13 may be cast or brazed thereon. These bosses, as stated above, may be formed on the inside of these plates if desired. I do not wish to be confined to these bosses and screws as means for fastening the cables and preventing them from pulling the wires out of the box, but I desire to reserve to myself the right to use any suitable type of fastening means adjacent the openings 14.

In practice, my improved switch box can be made with continuous sides, in which an opening can be formed by cutting out plates of the size and shape shown at 8, in the drawings. The edges of the opening can then be punched outward beyond the plane of the outer surfaces of the sides to a slight extent to form the rims 7. Other methods of making up the box can be followed if desired.

My improved outlet box is especially used in finished houses, and can also be used as a base receptacle box, if desired.

While I have shown the top and bottom of my improved outlet box as being formed with an opening therein, it is obvious that I may form the openings in the narrow sides of this box instead of in the top and bottom, and may use removable plates in this case the same as in the manner shown, and described above.

Having thus described my invention, I claim as new and desire to secure by Letters Patent:

1. A switch and receptacle box having a side with an opening therethrough, a removable plate for closing said opening, said side having a rim or flange for said opening located adjacent the outer face of said side to engage said plate, the engaging surface of said rim or flange being spaced from the inner face of the side a distance substantially equal to the thickness of the plate, whereby the inner face of the plate will be flush with the inner surface of the side when the plate is in position, said plate having one or more apertures therethrough to give passage to electric conductors entering said box, and means carried inside said box and engaging said plate to hold the same in detachable engagement with said rim or flange to close said opening.

2. A switch and receptacle box having a side with an opening therethrough, a removable plate for closing said opening, said side having a rim or flange for said opening located adjacent the outer face of said side to engage said plate, the engaging surface of said rim or flange being spaced from the inner face of the side a distance substantially equal to the thickness of the plate, whereby the inner face of the plate will be flush with the inner surface of the side when the plate is in position, said plate having one or more apertures therethrough to give passage to electric conductors entering said box, a transverse tenon carried inside of the box to engage a portion of the plate, and movable means also mounted on the inside of the box to engage the same opposite the portion engaged by the tenon, to hold the plate detachably in position.

3. A switch and receptacle box having a side with an opening therethrough, a removable plate for closing said opening, said side having a rim or flange for said opening located adjacent the outer face of said side to engage said plate, the engaging surface of said rim or flange being spaced from the inner face of the side a distance substantially equal to the thickness of the plate, whereby the inner face of the plate will be flush with the inner surface of the side when the plate is in position, said plate having one or more apertures therethrough to give passage to electric conductors entering said box, blocks or lugs mounted on the inside of said box adjacent the opening, adjustable means passing through said corner blocks to engage the plate, and means also mounted inside said box and engaging the plate opposite the corner blocks, whereby the said plate will be detachably held in position over the said opening.

4. A switch and receptacle box having a side with an opening therethrough, a removable plate for closing said opening, said side having a rim or flange for said opening located adjacent the outer face of said side to engage said plate, the engaging surface of said rim or flange being spaced from the inner face of the side a distance substantially equal to the thickness of the plate, whereby the inner face of the plate will be flush with the inner surface of the side when the plate is in position, said plate having one or more apertures therethrough to give passage to electric conductors entering said box, a transverse tenon mounted inside of said box adjacent said opening to engage the plate, blocks or lugs also mounted inside of said box opposite said tenon, and adjustable means passing through said corner blocks and engaging the plate to hold said plate detachably in position to close said opening.

In testimony whereof I have signed my name to this specification in the presence of two subscribing witnesses.

EDWARD ROSENKRANZ.

Witnesses:
   WILLIAM F. NICKEL,
   PHILIP D. ROLLHAUS.